US009432163B2

United States Patent
Varadarajan et al.

(10) Patent No.: US 9,432,163 B2
(45) Date of Patent: Aug. 30, 2016

(54) PSEUDORANDOM SEQUENCE GENERATION FOR OFDM CELLULAR SYSTEMS

(71) Applicant: TEXAS INSTRUMENTS INCORPORATED, Dallas, TX (US)

(72) Inventors: Badri N. Varadarajan, Mountain View, CA (US); Anand Ganesh Dabak, Plano, TX (US); Tarkesh Pande, Dallas, TX (US); Eko N. Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 220 days.

(21) Appl. No.: 14/289,264

(22) Filed: May 28, 2014

(65) Prior Publication Data

US 2016/0119094 A1    Apr. 28, 2016

Related U.S. Application Data

(63) Continuation of application No. 12/326,878, filed on Dec. 2, 2008, now Pat. No. 8,755,453.

(60) Provisional application No. 61/045,158, filed on Apr. 15, 2008, provisional application No. 61/045,863, filed on Apr. 17, 2008, provisional application No. 61/048,701, filed on Apr. 29, 2008, provisional application No. 61/049,135, filed on Apr. 30, 2008, provisional application No. 61/051,210, filed on May 7, 2008.

(51) Int. Cl.

| H04L 27/00 | (2006.01) |
|---|---|
| H04L 5/00 | (2006.01) |
| H04B 1/04 | (2006.01) |
| H04L 25/02 | (2006.01) |

(52) U.S. Cl.
CPC .............. *H04L 5/0048* (2013.01); *H04B 1/04* (2013.01); *H04L 25/0202* (2013.01)

(58) Field of Classification Search
CPC .  H04L 1/0003; H04L 1/0071; H04L 5/0007; H04L 1/0009; H04L 27/0008
USPC ......................................... 375/295, 316, 219
See application file for complete search history.

(56) References Cited

U.S. PATENT DOCUMENTS

| 2004/0230797 | A1 | 11/2004 | Ofek et al. |
| 2005/0201270 | A1 | 9/2005 | Song et al. |
| 2006/0002452 | A1 | 1/2006 | Loroia et al. |
| 2006/0028976 | A1* | 2/2006 | Park ..................... H04L 5/0048 370/203 |
| 2007/0217532 | A1 | 9/2007 | Park et al. |
| 2007/0253465 | A1* | 11/2007 | Muharemovic ....... H04L 5/0007 375/130 |
| 2009/0323642 | A1 | 12/2009 | Tanno et al. |

FOREIGN PATENT DOCUMENTS

KR    1020070083636    8/2007

* cited by examiner

*Primary Examiner* — Zewdu Kassa
(74) *Attorney, Agent, or Firm* — Ronald O. Neerings; Frank D. Cimino

(57) ABSTRACT

In one embodiment, a transmitter includes a binary sequence generator unit configured to provide a sequence of reference signal bits, wherein the sequence is an inseparable function of a cell identification parameter, a cyclic prefix mode corresponding to the transmitter and one or more time indices of the sequence. The transmitter also include a mapping unit that transforms the sequence of reference signal bits into a complex reference signal, and a transmit unit configured to transmit the complex reference signal. In another embodiment, a receiver includes a receive unit configured to receive a complex reference signal and a reference signal decoder unit configured to detect a sequence of reference signal bits from the complex reference signal, wherein the sequence is an inseparable function of a cell identification parameter, a cyclic prefix mode corresponding to a transmitter and one or more time indices of the sequence.

12 Claims, 3 Drawing Sheets

US 9,432,163 B2

PSEUDORANDOM SEQUENCE GENERATION FOR OFDM CELLULAR SYSTEMS

CROSS-REFERENCE TO RELATED APPLICATIONS

This application is a Continuation of application Ser. No. 12/326,878 filed Dec. 2, 2008, which claims the benefit of: U.S. Provisional Application Ser. No. 61/045,158, filed by Badri Varadarajan, Anand G. Dabak and Tarkesh Pande on Apr. 15, 2008, entitled "Pseudo-Random Sequence Generation for OFDM Cellular Systems"; U.S. Provisional Application Ser. No. 61/045,863, filed by Badri Varadarajan, Anand G. Dabak and Tarkesh Pande on Apr. 17, 2008, entitled "Pseudo-Random Sequence Generation for OFDM Cellular Systems"; U.S. Provisional Application Ser. No. 61/048,701, filed by Badri Varadarajan, Anand G. Dabak and Tarkesh Pande on Apr. 29, 2008, entitled "Pseudo-Random Sequence Generation for OFDM Cellular Systems"; U.S. Provisional Application Ser. No. 61/049,135, filed by Badri Varadarajan, Anand G. Dabak, Tarkesh Pande and Eko N. Onggosanusi on Apr. 30, 2008, entitled "Pseudo-Random Sequence Generation for OFDM Cellular Systems"; and U.S. Provisional Application Ser. No. 61/051,210, filed by Badri Varadarajan, Anand G. Dabak, Tarkesh Pande and Eko N. Onggosanusi on May 8, 2008, entitled "Pseudo-Random Sequence Generation for OFDM Cellular Systems", commonly assigned with this application and incorporated herein by reference.

TECHNICAL FIELD

This application is directed, in general, to a communication system and, more specifically, to a transmitter, a receiver and methods of operating a transmitter and a receiver.

BACKGROUND

In OFDM systems, the transmitter typically sends pre-determined values on specific time-frequency resource elements (tones) to enable channel estimation at the receiver. These pre-determined sequences, known as reference signals or pilot sequences, may be used by the receiver for chancel estimation, synchronization, noise covariance estimation and other purposes.

Assuming that tone k during OFDM symbol l is set aside for reference signaling, the transmit vector $x_{kl}$ is fixed beforehand and is therefore known to the receiver. Consequently the receiver uses the received signal on the tone, given by $$y_{kl} = H_k x_{kl} + n_{kl} \qquad (1)$$

to estimate the channel $H_{kl}$, the variance of the noise $n_{kl}$ and other related quantities. The exact sequences $\{x_{kl}\}$ to be transmitted on these reference signal tones is important for two reasons. First, they need to have sufficient randomness to ensure desirable properties like low peak-to-average-power ratio at an IFFT output. Further, they need to also be unique to each transmitter, to enable the receiver to differentiate one transmitter from another. Improvements in this area would prove beneficial in the art.

SUMMARY

In one embodiment, a transmitter includes a binary sequence generator unit configured to provide a sequence of reference signal bits, wherein the sequence is an inseparable function of a cell identification parameter, a cyclic prefix mode corresponding to the transmitter and one or more time indices of the sequence. The transmitter also include a mapping unit that transforms the sequence of reference signal bits into a complex reference signal, and a transmit unit configured to transmit the complex reference signal. In another embodiment, a receiver includes a receive unit configured to receive a complex reference signal and a reference signal decoder unit configured to detect a sequence of reference signal bits from the complex reference signal, wherein the sequence is an inseparable function of a cell identification parameter, a cyclic prefix mode corresponding to a transmitter and one or more time indices of the sequence.

In another aspect, a method of operating a transmitter includes providing a sequence of reference signal bits, wherein the sequence is an inseparable function of a cell identification parameter, a cyclic prefix mode corresponding to the transmitter and one or more time indices of the sequence. The method also includes transforming the sequence of reference signal bits into a complex reference signal and transmitting the complex reference signal. In another aspect, a method of operating a receiver includes receiving a complex reference signal and detecting a sequence of reference signal bits from the complex reference signal, wherein the sequence is an inseparable function of a cell identification parameter, a cyclic prefix mode corresponding to a transmitter and one or more time indices of the sequence.

BRIEF DESCRIPTION

Reference is now made to the following descriptions taken, in conjunction with the accompanying drawings, in which.

DETAILED DESCRIPTION

Figure 1:
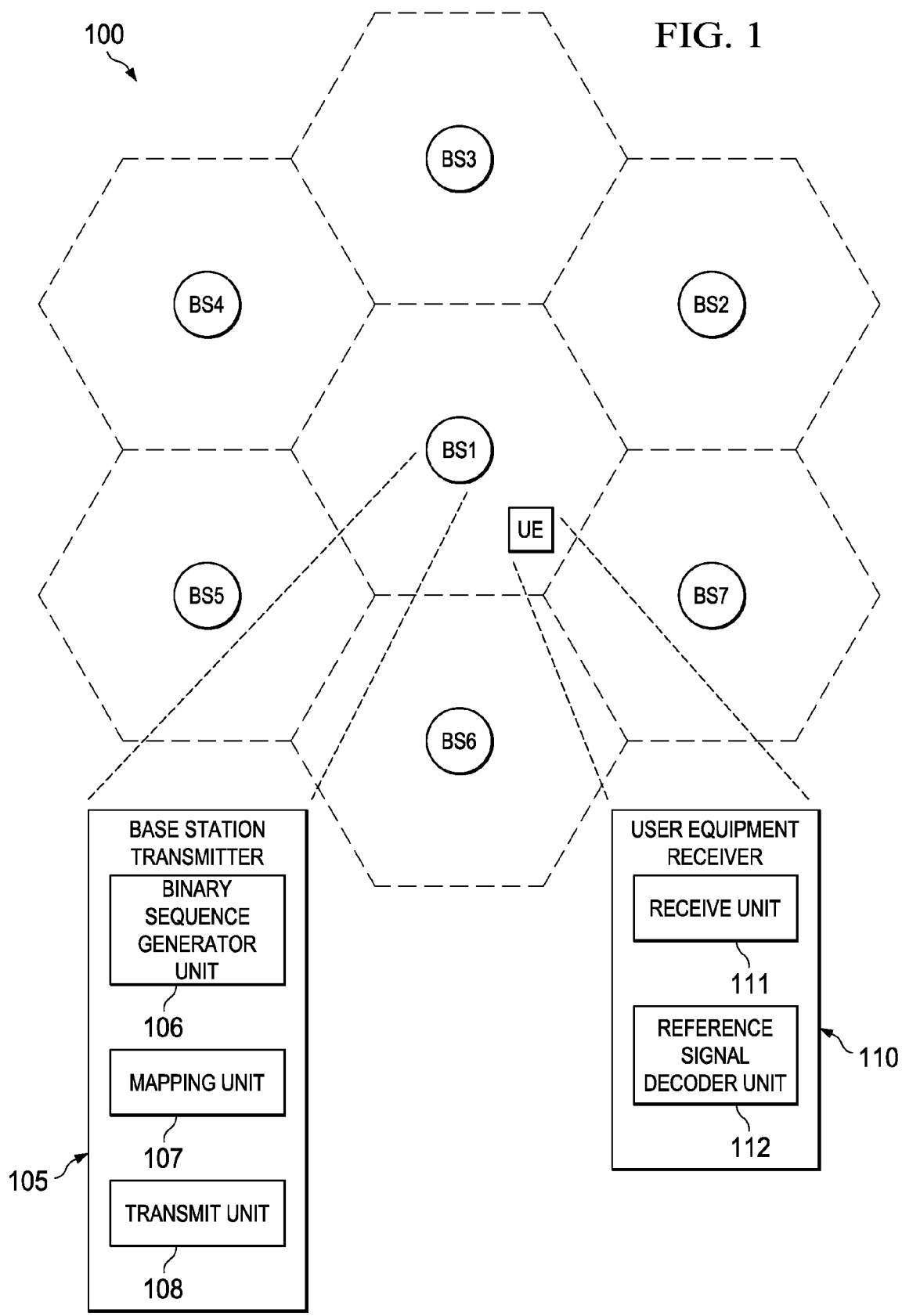
FIG. 1 illustrates an exemplary diagram of a cellular network employing embodiments a transmitter and a receiver constructed according to the principles of the present disclosure.

Currently, in OFDM systems, the reference signal structure is provided as a reference signal sequence $r_{l,n_s}(m)$ that is defined by $$r_{l,n_s}(m) = \frac{1}{\sqrt{2}}(1 - 2 \cdot c(2m)) + j\frac{1}{\sqrt{2}}(1 - 2 \cdot c(2m+1)), \qquad (2)$$

$$m = 0, 1, \ldots, 2N_{RB}^{max,DL} - 1,$$

where $n_s$ is the slot number within a radio frame and l is the OFDM symbol number within the slot. The pseudorandom sequence c(i) is defined below.

Pseudorandom sequences are defined by a length-31 Gold sequence. The output sequence c(n) of length $M_{PN}$, where n=0, 1, . . . , $M_{PN}$−1 is defined by $$c(n)=(x_1(n+N_C)+x_2(n+N_C)) \bmod 2, \quad (3a)$$

$$x_1(n+31)=(x_1(n+3)+x_1(n)) \bmod 2, \text{ and} \quad (3b)$$

$$x_2(n+31)=(x_2(n+3)+x_2(n+2)+x_2(n+1)+x_2(n)) \bmod 2, \quad (3c)$$

where $N_C$=1600 and the first m-sequence is initialized with $x_1(0)=1$, $x_1(n)=0$, n=1, 2, . . . , 30. The initialization of the second m-sequence is denoted by $$c_{init} = \sum_{i=0}^{30} x_2(i) \cdot 2^i$$

with a value depending on the application of the sequence.

The initialization value $c_{init}$ is chosen to ensure that the reference signals from different transmitters look different, and also that the reference signals from the same transmitter vary with time. This is to ensure that a receiver in one transmitter's cell can distinguish that transmitter's signals from interfering signals from other nearby transmitters. Thus, the initialization value $c_{init}$ is a function of the cell identification number $N_{ID}^{cell}$ of the transmitter, the slot index $n_s$ and the symbol index L within the subframe.

Currently, the pseudorandom sequence generator is initialized with $$c_{init} = 2^{13} \cdot L + 2^9 \cdot \left\lfloor \frac{n_s}{2} \right\rfloor + N_{ID}^{cell}$$

at the start of each OFDM symbol, where L=($n_s$ mod 2)·$N_{symb}^{DL}$+l is the OFDM symbol number within a subframe. Pictorially, this can be viewed as an initialization of the 31-bit initial register as follows: with the nine LSBs corresponding to the cell identification number, the next four significant bits corresponding to the subframe number and the subsequent four bits corresponding to the symbol number.

Current Reference Signal Structure

| (31 − 17 = 14) Zeros | 4-bit Symbol Number | 4-bit Subframe Number | 9-bit cell ID |
|---|---|---|---|

While the above initialization used currently does make the initialization depend on both the cell id and time, it does not effectively distinguish between reference signals from different cells. To demonstrate the ineffectiveness of the current reference signal structure in differentiating among different communication cells, the following may be noted. First, the pseudorandom bit sequence output $x_2(n)$ is a linear function of the initial seed $c_{init}$. This follows from the fact that $x_2(n)$ is just the output of a linear binary filter whose initial state is $c_{init}$.

Suppose the initial state a=[a(30)a(29) . . . a(0)] yields the sequence A(n), and the initial state b=[b(30)b(20) . . . b(0)] yields the sequence B(n). Then it may be demonstrated that the initial state c=(a+b)mod 2 yields the sequence C(n)=(A(n)+B(n))mod 2. For recursion by induction, assume that for n=0, 1, 2, . . . , (N+30), the relationship C(n)=(A(n)+B(n)) mod 2 holds true. Then, show that it also holds true for n=(N+31).

$$C(N+31) = \{C(N+3) + C(N+2) + C(N+1) + C(N)\} \bmod 2 =$$
$$\{A(N+3) + B(N+3) + A(N+2) + B(N+2) +$$
$$A(N+1) + B(N+1) + A(N) + B(N)\} \bmod 2 =$$
$$[\{A(N+3) + A(N+2) + A(N+1) + A(N)\} \bmod 2 +$$
$$\{B(N+3) + B(N+2) + B(N+1) + B(N)\} \bmod 2] \bmod 2 =$$
$$[A(N+31) + B(N+31)] \bmod 2.$$

Then, for initialization by induction, by definition for n=0, 1, . . . , 30, the relationship C(n)=(A(n)+B(n))mod 2 holds.

Secondly, consider that the pseudorandom bit sequence is a linear sum of three separable components due to the cell ID, subframe number and symbol number respectively. This follows as a consequence of the previous analysis and the structure of the initial seed. For convenience, denote the cell id $N_{id}^{cell}$ by M and the subframe index $$\left\lfloor \frac{n_s}{2} \right\rfloor$$

by S. Denote the sequence $x_2(n)$ corresponding to the combination (M, S, L) as $x_{2-M,S,L}(n)$. Then, substituting the initialization $c_{init}$=M+$2^9$*(S)+$2^{13}$*L and noting the linearity showed above, one may obtain equation (4).

$$x_{2-M,S,L}(n)=x_{2-M,0,0}(n)+x_{2-0,S,0}(n)+x_{2-0,0,L}(n). \quad (4)$$

As a consequence, note that the overall pseudorandom sequence for the reference signal sequence generation also has a separability property seen below wherein $$c_{M,S,L}(n)=x_1(n)+x_{2-M,0,0}(n)+x_{2-0,S,0}(n)+x_{2-0,0,L}(n). \quad (5)$$

In other words, the reference signal sequence is said to be a separable function when the sequence can be linearly separated into components, each of which are functions of only one of the cell identification and time indices (e.g., subframe index and symbol index).

As a consequence of its separability property, the current reference signal structure offers inadequate time diversity while differentiating between two cell IDs. In other words, comparing two cells on a given tone, their reference signal sequences are either the same for all time or different for all time. This follows directly from the equation above. Specifically, if one considers the difference between the sequences of the two cells M and N, $$c_{M,S,L}(n)+c_{N,S,L}(n)=x_{2-M,0,0}(n)+x_{2-N,0,0}(n) \quad (6)$$

Clearly, the difference does not depend on the symbol index L or the subframe index S.

A major disadvantage of the current reference signal structure occurs where two cells are synchronous and have the same reference signal tone locations. In this case, user equipment in one of these cells will not be able to reject the interference from the other cell by time interpolation across pilot channel estimates on different symbols. The only rejection comes from frequency interpolation. In particular, when the channel is long in the time domain, the coherence bandwidth is low and frequency interpolation is impacted.

As described above, a key problem is that the current reference signal structure is separable. Embodiments of this disclosure offer a modification in the art to generate sequences that are inseparable. That is, these sequences are not linearly separable into a form similar to equation (5) as a function of M, S and L. These embodiments therefore offer time diversity in resolving one base station from another.

FIG. 1 illustrates an exemplary diagram of a cellular network 100 employing embodiments a transmitter and a receiver constructed according to the principles of the present disclosure. In the illustrated embodiment, the cellular network 100 is part of an OFDM system and includes a cellular grid having a centric cell and six surrounding first-tier cells. The centric cell employs a centric base station BS1, and the surrounding first-tier cells employ first-tier base stations BS2-BS7, as shown.

The centric base station BS1 includes a base station transmitter 105. The base station transmitter 105 includes a binary sequence generator unit 106, a mapping unit 107 and a transmit unit 108. User equipment (UE) is located near a cell boundary between base station transmitters, as shown. The UE includes a receiver 110 having a receive unit 111 and a reference signal decoder unit 112.

In the base station transmitter 105, the binary sequence generator unit 106 is configured to provide a sequence of reference signal bits, wherein the sequence is an inseparable function of a cell identification parameter, a cyclic prefix mode corresponding to the transmitter and one or more time indices of the sequence. The mapping unit 107 is configured to transform the sequence of reference signal bits into a complex reference signal, and the transmit unit 108 is configured to transmit the complex reference signal.

In the UE receiver 110, the receive unit 111 is configured to receive a complex reference signal, and the reference signal decoder unit 112 is configured to detect a sequence of reference signal bits from the complex reference signal, wherein the sequence is an inseparable function of a cell identification parameter, a cyclic prefix mode corresponding to a transmitter and one or more time indices of the sequence.

Figure 2:
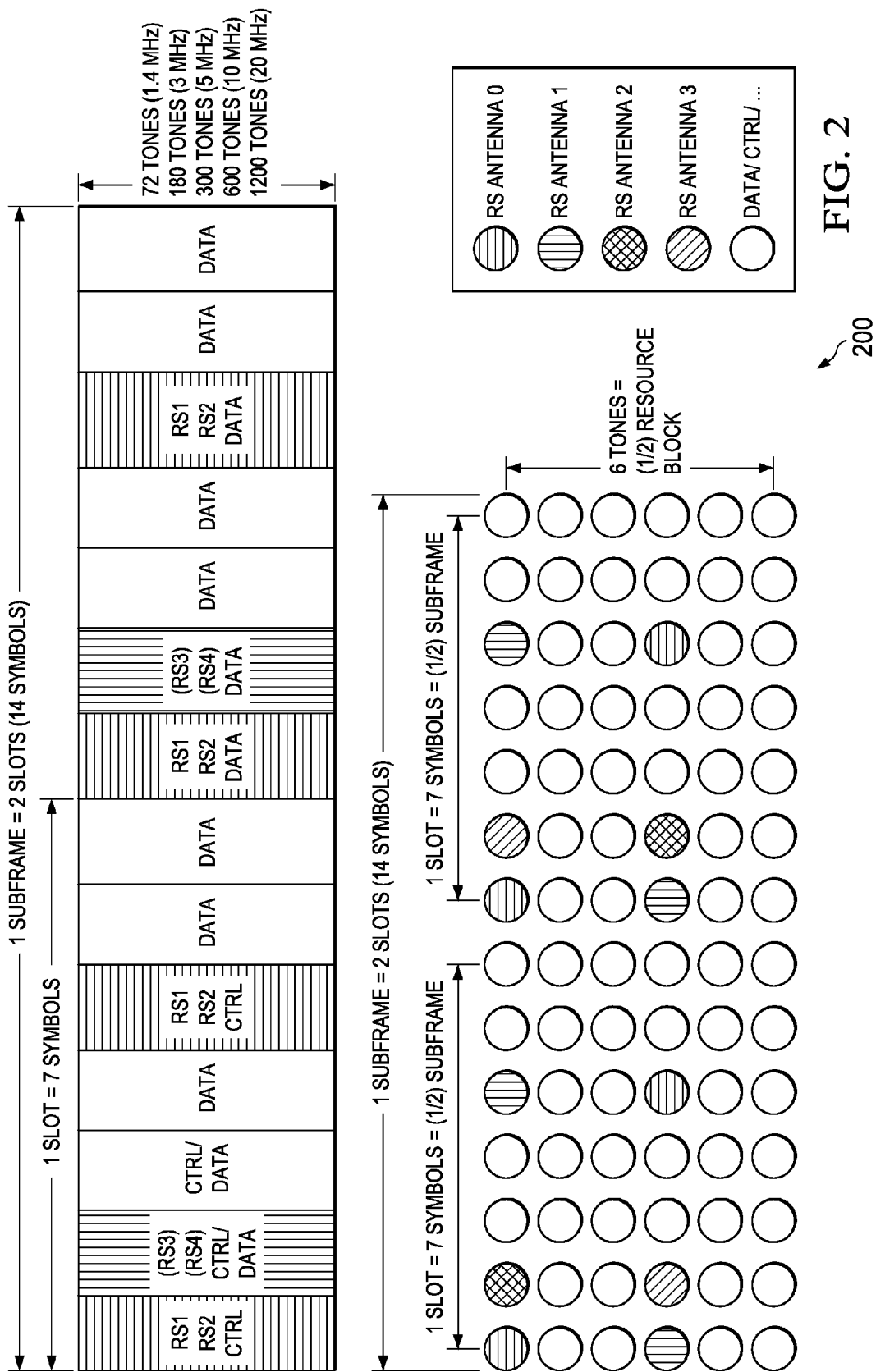
FIG. 2 illustrates an example of a time-frequency transmission pattern showing reference signal positions as may be employed by the transmitter of FIG. 1.

FIG. 2 illustrates an example of a time-frequency transmission pattern 200 showing reference signal positions as may be employed by the transmitter of FIG. 1. The receiver uses the knowledge of the reference signal positions and reference signals for channel estimation purposes. The channel estimates in turn may be employed for coherent data decoding, determining noise variance estimates and calculating RSRP (reference signal reference power), RSRQ (reference signal reference quality) and SNR (signal to noise ratio) metrics.

Figure 3:
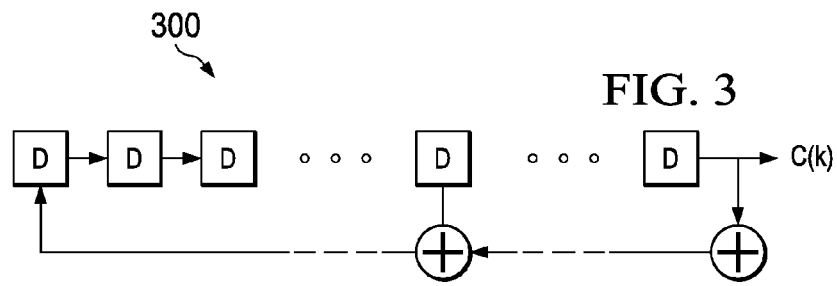
FIG. 3 illustrates a general diagram of a pseudorandom bit sequence generator employing a linear feedback shift register.

FIG. 3 illustrates a general diagram of a pseudorandom bit sequence generator 300 employing a linear feedback shift register. In the illustrated example, the pseudorandom sequence generator (PRS) 300 employs 31 bit positions. Each of the bit positions employs a register D, which provides a delay that is based on a clocking function.

At every clock cycle the sequence of bits is shifted to the right and the right most bit that is shifted out of the shift register is part of the pseudo-random sequence c(k). The right most bit is also logically Exclusive-Ored (XORed) with some of the bits in the 31 bit locations and fed-back to the left most register. This explains why these pseudo-random generators are also referred to as linear feedback shift registers (LFSRs). The bit locations used for XORing are fixed and given by the shift register polynomial.

Referring again to FIG. 1 and recalling that a key problem is the separability of the reference signal sequence into components depending only on the cell ID and the time variables. Embodiments of the present disclosure presented below provide solutions to this key problem.

In several embodiments, the number of fast forward terms $N_c$ is changed on a symbol or cell-specific basis. In the simplest embodiment, the fast forward sequence "hops" from one symbol to the next. Then, the RS becomes $$c_{M,S,L}(n) = x_1(n+\Delta_L) + x_{2-M,0,0}(n+\Delta_L) + x_{2-0,S,0}(n+\Delta_L) + x_{2-0,0,L}(n+\Delta_L). \quad (7)$$

Then, the difference between RS sequences from two cell IDs is $$c_{M,S,L}(n) + c_{N,S,L}(n) = x_{2-M,0,0}(n+\Delta_L) + x_{2-N,0,0}(n+\Delta_L), \quad (8)$$

which does vary from one symbol to the next because of the dependence of $\Delta_L$ on L.

A main advantage of this embodiment is that it preserves the current signal structure with only an additional dependence of the fast-forward length on symbol or subframe index. The disadvantage is that one now needs to be able to handle different fast forward lengths. Roughly, each forward length has an associated cost of 17*31 bits to store the impulse response of the pseudorandom bit sequence after the given number of fast forward time instances. As the number of fast forward lengths increases, the additional memory requirement is given as above.

Many forms of fast-forward duration hopping are covered in this disclosure. One skilled in the pertinent art will recognize that many others may be constructed according to the principles of the present disclosure. An exemplary embodiment is to choose $N_c(S,L) = 1600 + S + L$. Another exemplary embodiment is to choose $N_c(S,L) = 1600 + L$. This can be generalized to the form $N_c(S,L) = 1600 + f(S,L)$, where $f(S,L)$ is any function with input arguments S and L.

Another exemplary embodiment is to use to a hashing function to obtain the fast-forward duration. Here, the fast-forward duration is recursively updated as follows, where $\alpha$ and $\Delta_{max}$ are some constants. The sequence is reset frequently, probably every few subframes, every frame or every several frames.

$$N_c(i) = N_0 + \Delta(i), \quad (9)$$

$$\Delta(i) = \alpha \Delta(i-1) \bmod \Delta_{max} + 1, \Delta_0 = \text{some function of cell id } M \quad (10)$$

Recall that the reason for the separability of the current, output sequences is that the pseudorandom bit sequence seed $c_{init}$ is just a sum of the cell ID and sub frame and symbol indices. Therefore, embodiments of the present disclosure provide a mixed initialization which is not linear (i.e., nonlinear). As an example, some hashing function is used to obtain the initial state from the three intra-dependent quantities. The hashing function may contain products of two or more linear terms of the symbol number L, the sub frame number S and the cell ID M in the form of $(a_1 L + b_1)$, $(a_2 S + b_2)$, $(a_3 M + b_3)$ where $a_1, a_2, a_3, b_1, b_2, b_3$ are real numbers. For example, $$C_{init} = 2^{13} * ((L+1)*(S+1)*(M+1)) + 2^9 * S + M. \quad (11)$$

In addition to the parameters mentioned so far, one might also make the initialization depend on the cyclic prefix (CP) mode. The extended CP mode contains fewer symbols per subframe than the normal CP mode. An indicator function F may be assumed, which takes one of two distinct values depending on the CP mode. For instance, F could be 0 or 1 for the two modes. Alternatively, it could equal the number of symbols in a subframe or in a slot (half of a subframe.)

Note that the above initialization might also remove the need for fast-forwarding in the first place by reducing the peak-to-average-power-ratio. The advantage of the above embodiment is that it does not result in additional implementation complexity. Since many variants of the initialization are possible, it is useful to view these various embodiments as instances of general forms. In one exemplary case, a sum of products form contains $$C_{init} = \sum_{i=1}^{N} \sigma_i M^{a_i} L^{b_i} S^{c_i} F^{d_i}, \quad (12)$$

where $\{\sigma, a_1, b_1, c_1, d_1\}$ are all integers. A crucial part of this disclosure is that there is at least one term in the above sum such that $\sigma_1$ is non-zero and at least two of the integers $\{a_1, b_1, c_1, d_1\}$. The analogy to a product of sums form is straightforward, but given below for completeness $$C_{init} = \prod_{i=1}^{N} \sigma_i (M+a_i)(L+b_i)(S+c_i)(F+d_i). \quad (13)$$

As a specific example, the initialization for the reference signal may be given by $c_{init}=2^{10} \cdot (7 \cdot (n_s+1)+l+1) \cdot (2 \cdot N_{ID}^{cell}+1)+2 \cdot N_{ID}^{cell}+N_{CP}$ at the start of each OFDM symbol where $$N_{CP} = \begin{cases} 1 & \text{for normal } CP \\ 0 & \text{for extended } CP \end{cases}.$$

In the above, $N_{ID}^{cell}$ corresponds to the cell ID M, $N_{CP}$ corresponds to the indicator function F, $n_s$ corresponds to the slot number and is related to the subframe number S by $$S = \left\lfloor \frac{n_s}{2} \right\rfloor$$

and l corresponds to the symbol number in a slot that s related to the symbol number in a subframe L by $L=N_{Symb}^{DL}$ ($n_s$ mod 2)+l. It is clear that the RS initialization can then be expressed in the sum of product form (12) with the following parameters shown in Table 1 below.

TABLE 1

|  | $\sigma_1$ | $a_1$ | $b_1$ | $c_1$ | $d_1$ |
|---|---|---|---|---|---|
| i = 1 | $2^{13}$ | 0 | 0 | 0 | 0 |
| i = 2 | 1 | 0 | 0 | 0 | 1 |
| i = 3 | $2^{10}$ | 0 | 1 | 0 | 0 |
| i = 4 | $7 \cdot 2^{10}$ | 0 | 0 | 1 | 0 |
| i = 5 | $2^{11}$ | 1 | 1 | 0 | 0 |
| i = 6 | $2^{14.2}$ | 1 | 0 | 0 | 0 |
| i = 7 | $7 \cdot 2^{11}$ | 1 | 0 | 1 | 0 |

Another alternative form contains multi-linear terms of M, L, and S with the dependence on the CP configuration is of the following multiplicative form:

$$C_{init} = \left[ \sum_{m=1}^{N_M} (A_m * M + B_m) \right] \left[ \prod_{n=1}^{N_L} (C_n * L + D_n) \right] \left[ \prod_{p=1}^{N_S} (E_p * S + F_p) \right]. \quad (14)$$

Here, $N_M$, $N_L$, $N_S$ are the number of multiplicative terms corresponding to the multi-linear function of M, L, and S, respectively. To capture the dependence on the CP configuration, at least one of the multi-linear constant $\{A_m, B_m\}$, $\{C_n, D_n\}$, $\{E_p, F_p\}$ is made dependent on the CP configuration. As an example, choosing $$N_M = 2, N_L = 2, N_S = 1, B_2 = D_2 = \frac{N_{sym}}{2}, B_1 = D_1 = F_1 = 1,$$

and $A_1 = A_2 = C_1 = C_2 = E_1 = 1$, $$C_{init} = (M+1) \times \left(M + \frac{N_{sym}}{2}\right) \times (L+1) \times \left(L + \frac{N_{sym}}{2}\right) \times (S+1) \quad (15)$$

Or alternatively, if $B_2 = D_2 = 3+N_{CP}$ where $N_{CP}=0$ for short-CP and $N_{CP}=1$ for extended CP $$C_{init} = (M+1) \times (M+3+N_{CP}) \times (L+1) \times (L+3+N_{CP}) \times (S+1) \quad (16)$$

Yet another exemplary embodiment modifies the above initialization(s) by adding functions of additional parameters. For example, one might also need to use a flag to differentiate between short CP and extended CP subframes in the scrambling sequence initialization. This could be done as follows.

$$C_{init} = 2^{I_{cp}} * F_{cp} + 2^{13} * ((L+1)*(S+1)*(M+1)) + 2^9 * S + M, \quad (17)$$

where $F_{cp}$ is 0 or 1 depending on short or extended CP, and $I_{cp}$ is a shift parameter which could be 29, 30 or some other value between 0 and 28. Again, the initial value is set every few subframes or every frame or every few frames.

Yet another exemplary embodiment modifies the above initialization by combining the symbol and subframe indices before multiplying with the cell ID. One example of such an initialization is $$C_{init} = 2^9 * (N_{sym} * S + L + 1) * (M+1) + M, \quad (18)$$

where $N_{sym}$ is the number of symbols in one subframe. The advantage of this initialization is that it also helps to differentiate between extended and short CP modes because $N_{sym}$ is different in the two. Note that the above is just one exemplary initialization, while the general principle is to combine symbol and subframe indices in one term before multiplication.

A few other exemplary initializations are listed, in keeping with the general procedure described herein. In a first example, $C_{init} = 2^9 * ((N_{sym}+\delta)*(S+\alpha)+L+1)*(\beta*M+\gamma)+M$, where $\alpha$, $\delta$, $\beta$ and $\gamma$ are integers. One example is $\delta=0$, $\alpha=1$, $\beta=2$, $\gamma=1$, which yield $C_{init} = 2^9 * (N_{sym}*(S+1)+L+1)*(2*M+1)$. More generally, the form $$C_{init} = 2^9 * ((K_{CP}+\delta)*(S+\alpha)+L+1)*(\beta*M+\gamma)+M \quad (19)$$

where $K_{CP}$ is an integer whose value and depends on whether short or extended CP is configured. For instance, $K_{CP}=N_{sym}$ which is 14 and 12 for short and extended CP, respectively.

In a second example, equivalently, one can also use the slot index and the number of symbols per slot, to do the initialization. Define l=symbol number in slot, S'=slot number $$\left(S = \left\lfloor \frac{S'}{2} \right\rfloor\right).$$

Then, equation 19 above equivalently becomes $$C_{init} = 2^9 * \left(\left(\frac{N_{sym}}{2} + \delta'\right) * (S' + \alpha') + l + 1\right) * (\beta * M + \gamma) + M. \quad (20)$$

where again $\alpha'$, $\delta'$, $\beta$ and $\gamma$ are integers. Again, choosing $\delta'=0$, $\alpha'=1$, $\beta=2$, $\gamma=1$, $$C_{init} = 2^9 * \left(\frac{N_{sym}}{2} * (S' + 1) + l + 1\right) * (2 * M + 1) + M. \quad (21)$$

More generally, $N_{sym}$ can be replaced with $K_{CP}$ which is an integer whose value depends on the whether short or extended CP is configured.

In a third example, yet another embodiment involves adding an explicitly offset depending on the CP mode instead of using the number of symbols in the subframe. Thus, $$C'_{init} = F_{cp} + C_{init} \quad (22)$$

where $C_{init}$ is any of the examples described above, and $F_{cp}$ takes on two values $f_1$ and $f_2$ depending on the CP mode. For example, $C_{init}=0+2^9*(v(S'+\alpha')+l+1)*(\beta*M+\gamma)+M$ for the short CP mode, and $=2^{N_{off}}+2^9*(v(S'+\alpha')+l+1)*(\beta*M+\gamma)+M$ for the extended CP mode. $N_{off}=29$ or 30 is an example.

Embodiments of the present disclosure also provide variants of the above procedures where different but equivalent indices are used for the various quantities involved. For example, one might index the symbol by its position among reference symbols instead of its symbol index in the subframe. (Thus, in a subframe carrying reference signals on symbols 0, 4, 7 and 11, these four symbols could be numbered as {0,4,7,11} or {0,1,2,3} or {1,2,3,4}, etc., for the purpose of the scrambling sequence generation. One exemplary embodiment of such an indexing in combination with the aforementioned techniques is given below. The seed for the ith reference symbol in subframe S for cell id M could be given by $$C_{init} = 2^9(2M+1)(L+1) + M \quad (23)$$

With $L=4S+l'$, where $S$ is the subframe index (numbered with some 10 distinct integers, for example 0-9 or 1-10) and $l'=0, 1, 2, 3$ is the index of OFDM symbols carrying reference signal within a subframe for antenna 0 and 1. For antenna 2 and 3, the same equation could be used with $L=4S+l'$, where $l'=\{0,2\}$ or $\{0,1\}$ is the index of OFDM symbols carrying reference signal within one subframe for the two reference symbols in the subframe. Other embodiments of the above example are possible, including the ones given below.

The equation for the seed is identical to the above, with a different definition of the quantity L, which permits better distinction between short and long CP modes. In one example, $L=(4+F_{cp})*(S+c)+l'$ for antenna 0 and 1. $l'=0, 1, 2, 3$. $F_{cp}$ is either 0 or 1 depending on CP mode (both combinations allowed). More generally, $L=a*(S+c)+l'$ for normal CP, $b*(S+d)+l'$ for long CP, a, b, c, d are possibly distinct integers. Here, either c!=d or c=d is possible, e.g. (c=d=1). In another example, $L=(2+F_{cp})*(S+c)+l'$ antenna 2 and 3. $l'=0, 1$ or $l'=0, 2$. More general, $L=a'*(S+c)+l'$ for normal CP, $b'*(S+d)+l'$ for long CP, a' and b' are possibly distinct integers, possibly different from a and b. Here, either c!=d or c=d is possible, for example, (c=d=1).

Again, the above embodiment can be combined with other linear terms which may be constant, or may depend on the cell id alone, the subframe index alone or the antenna index or CP mode. For example, the initialization would be of the form $$L = a*(S+c) + l' + G_{cp} \quad (24)$$

where $G_{cp}$ is an integer depending on the CP mode, for instance $G_{cp}$ belonging to {0,1} or {1,2} depending on the CP mode. A numerical example of such an initialization would be $L=4*S+l'+G_{cp}$ where $l'$ is the RS symbol index within the subframe and could be drawn from different sets of dimension 4 and 2 for antenna ports {0,1} and {2,3} respectively.

Another exemplary embodiment is to use a recursive hashing function for the initial seed. Thus, the initial value is set as follows, where D is a constant integer, for instance $D=2^{31}-1$.

$$C_{init}(i) = \alpha C_{init}(i-1) \mod D + 1, \quad (25)$$

and $$C_{init}(0) = \text{some function of cell id } M. \quad (26)$$

Figure 4:
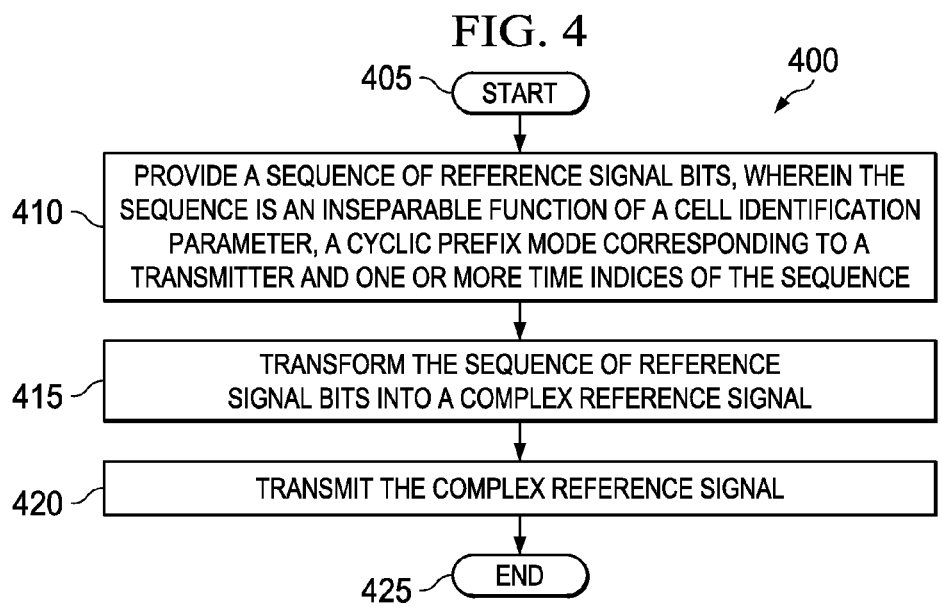
FIG. 4 illustrates a flow diagram of an embodiment of a method of operating a transmitter for use with a base station and carried out according to the principles of the present disclosure.

FIG. 4 illustrates a flow diagram of an embodiment of a method of operating a transmitter 400 carried out according to the principles of the present disclosure. The method 400 may be employed in a base station of an OFDM system and starts in a step 405. Then, in a step 410, a sequence of reference signal bits is provided in the transmitter, wherein the sequence is an inseparable function of a cell identification parameter, a cyclic prefix mode corresponding to the transmitter and one or more time indices of the sequence.

In one embodiment, the sequence of reference signal bits is generated by a linear feedback shift register capable of employing an initial seed, an update equation and a fast forward parameter. The fast forward parameter of the linear feedback shift register is a function of the cell identification parameter and one or more of the time indices. Additionally, the initial seed of the linear feedback shift register is a nonlinear function of the cell identification parameter, the cyclic prefix mode and the time indices.

In one embodiment, the initial seed of the linear feedback shift register is a sum of terms and each term is proportional to a product of integer powers of the cell identification parameter, the cyclic prefix mode, the symbol index and the subframe index. For at least one term, the integer powers corresponding to the cell identification parameter, the symbol index, and the subframe index are all greater than zero. Additionally, the initial seed of the linear feedback shift register may be given by $c_{init}=2^{10} \cdot (7 \cdot (n_s+1)+l+1) \cdot (2 \cdot N_{ID}^{cell}+1) + 2 \cdot N_{ID}^{cell} + N_{CP}$, where $N_{ID}^{cell}$ denotes the cell identification parameter, $N_{CP}$ denotes the cyclic prefix mode and time indices are a subframe index $n_s$ and a symbol index l.

In one embodiment, the initial seed of the linear feedback shift register is a product of terms and each term is a scaled sum of the cell identification parameter, the cyclic prefix mode, the subframe index and the symbol index. Additionally, at least one term has a non-zero scaling corresponding to the cell identification parameter, the cyclic prefix mode, the subframe index and the symbol index. The sequence of reference signal bits is transformed into a complex reference signal in a step 415, and the complex reference signal is transmitted in a step 420. The method 400 ends in a step 425.

Figure 5:
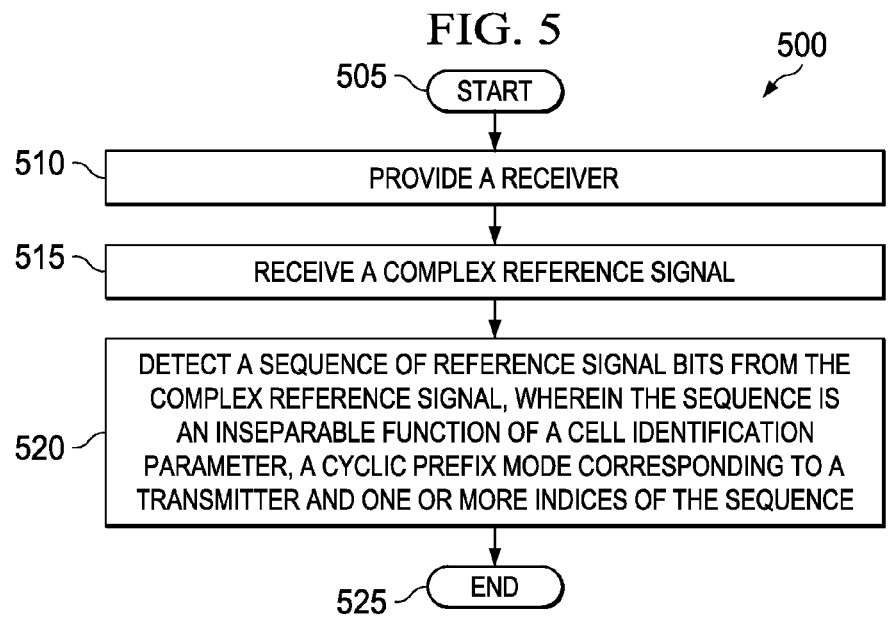
FIG. 5 illustrates a flow diagram of an embodiment of a method of operating a receiver for use with user equipment and carried out according to the principles of the present disclosure.

FIG. 5 illustrates a flow diagram of an embodiment of a method of operating a receiver 500 and carried out according to the principles of the present disclosure. The method 500 may be employed with an OFDMA system and starts in a step 505. Then, a receiver is provided in user equipment employed in the OFDM system in a step 510, and a complex reference signal is received in a step 515. A sequence of reference signal bits is detected from the complex reference signal in a step 520, wherein the sequence is an inseparable function of a cell identification parameter, a cyclic prefix mode corresponding to a transmitter and one or more time indices of the sequence.

In one embodiment, the sequence of reference signal bits is generated by a linear feedback shift register capable of employing an initial seed, an update equation and a fast forward parameter. The fast forward parameter of the linear feedback shift register is a function of the cell identification parameter and one or more of the time indices. Additionally, the initial seed of the linear feedback shift register is a nonlinear function of the cell identification parameter, the cyclic prefix mode and the time indices.

In one embodiment, the initial seed of the linear feedback shift register is a sum of terms and each term is proportional to a product of integer powers of the cell identification parameter, the cyclic prefix mode, the symbol index and the subframe index. For at least one term, the integer powers corresponding to the cell identification parameter, the symbol index, and the subframe index are all greater than zero. Additionally, the initial seed of the linear feedback shift register may be given by $c_{init}=2^{10} \cdot (7 \cdot (n_s+1)+l+1) \cdot (2 \cdot N_{ID}^{cell}+1)+2 \cdot N_{ID}^{cell}+N_{CP}$, where $N_{ID}^{cell}$ denotes the cell identification parameter, $N_{CP}$ denotes the cyclic prefix mode and time indices are a subframe index $n_s$ and a symbol index l.

In one embodiment, the initial seed of the linear feedback shift register is a product of terms and each term is a scaled sum of the cell identification parameter, the cyclic prefix mode, the subframe index and the symbol index. Additionally, at least one term has a non-zero scaling corresponding to the cell identification parameter, the cyclic prefix mode, the subframe index and the symbol index. The method ends in a step 525.

Those skilled in the art to which this application relates will appreciate that other and further additions, deletions, substitutions and modifications may be made to the described embodiments.

What is claimed is:

1. A transmitter, comprising:
   a binary sequence generator unit configured to provide a sequence of reference signal bits, wherein the sequence is a function of a cell identification parameter, a cyclic prefix mode corresponding to the transmitter and one or more time indices of the sequence;
   wherein the sequence of reference signal bits is generated by a linear feedback shift register capable of employing an initial seed, an update equation and a fast forward parameter;
   wherein the initial seed of the linear feedback shift register is a sum of terms and each term is a function of the cell identification parameter, the cyclic prefix mode and one or more time indices;
   a mapping unit that transforms the sequence of reference signal bits into a complex reference signal; and
   a transmit unit configured to transmit the complex reference signal.

2. The transmitter as recited in claim 1 wherein the fast forward parameter of the linear feedback shift register is a function of the cell identification parameter and one or more of the time indices.

3. The transmitter as recited in claim 1 wherein for at least one term, the function is a product of integer powers corresponding to the cell identification parameter, the symbol number, and the slot number wherein all integer powers are greater than zero.

4. The transmitter as recited in claim 1 wherein the initial seed of the linear feedback shift register is given by $c_{init}=2^{10} \cdot (7 \cdot (n_s+1)+l+1) \cdot (2 \cdot N_{ID}^{cell}+1)+2 \cdot N_{ID}^{cell}+N_{CP}$, where $N_{ID}^{cell}$ denotes the cell identification parameter, $N_{CP}$ denotes the cyclic prefix mode and time indices are a slot number $n_s$ and a symbol number l.

5. The transmitter as recited in claim 1 wherein the initial seed of the linear feedback shift register is a product of terms and each term is a scaled sum of the cell identification parameter, the cyclic prefix mode, the subframe index and the symbol index.

6. The transmitter as recited in claim 5 wherein at least one term has a non-zero scaling corresponding to the cell identification parameter, the cyclic prefix mode, the slot number and the symbol number.

7. A method of operating a transmitter, comprising:
   providing a sequence of reference signal bits, wherein the sequence is a function of a cell identification parameter, a cyclic prefix mode corresponding to the transmitter and one or more time indices of the sequence;
   wherein the sequence of reference signal bits is generated by a linear feedback shift register capable of employing an initial seed, an update equation and a fast forward parameter;
   wherein the initial seed of the linear feedback shift register is a sum of terms and each term is a function of the cell identification parameter, the cyclic prefix mode, and one or more time indices;
   transforming the sequence of reference signal bits into a complex reference signal; and
   transmitting the complex reference signal.

8. The method as recited in claim 7 wherein the fast forward parameter of the linear feedback shift register is a function of the cell identification parameter and one or more of the time indices.

9. The method as recited in claim 7 wherein for at least one term, the function is a product of integer powers corresponding to the cell identification parameter, the symbol number, and the slot number wherein all integer powers are greater than zero.

10. The method as recited in claim 7 wherein the initial seed of the linear feedback shift register is given by $c_{init}=2^{10} \cdot (7 \cdot (n_s+1)+l+1) \cdot (2 \cdot N_{ID}^{cell}+1)+2 \cdot N_{ID}^{cell}+N_{CP}$, where $N_{ID}^{cell}$ denotes the cell identification parameter, $N_{CP}$ denotes the cyclic prefix mode and time indices are a slot number $n_s$ and a symbol number l.

11. The method as recited in claim 7 wherein the initial seed of the linear feedback shift register is a product of terms and each term is a scaled sum of the cell identification parameter, the cyclic prefix mode, the slot number and the symbol number.

12. The method as recited in claim 11 wherein at least one term has a non-zero scaling corresponding to the cell identification parameter, the cyclic prefix mode, the slot number and the symbol number.

* * * * *